(12) United States Patent
Suzui et al.

(10) Patent No.: US 6,856,497 B2
(45) Date of Patent: Feb. 15, 2005

(54) SYSTEM INTERCONNECTION APPARATUS AND CONNECTION METHOD THEREOF

(75) Inventors: Masaki Suzui, Kyoto (JP); Naoki Manabe, Kanagawa (JP); Nobuyoshi Takehara, Kyoto (JP)

(73) Assignee: Canon Kabushiki Kaisha, Tokyo (JP)

(*) Notice: Subject to any disclaimer, the term of this patent is extended or adjusted under 35 U.S.C. 154(b) by 333 days.

(21) Appl. No.: 09/960,284

(22) Filed: Sep. 24, 2001

(65) Prior Publication Data

US 2002/0085325 A1 Jul. 4, 2002

(30) Foreign Application Priority Data

Sep. 29, 2000 (JP) .................................. 2000-300162

(51) Int. Cl.[7] ........................................... H02H 3/00
(52) U.S. Cl. ............................................... 361/42
(58) Field of Search .................. 361/42; 323/361; 363/79, 95; 136/248

(56) References Cited

U.S. PATENT DOCUMENTS 6,101,073 A * 8/2000 Takehara ..................... 361/42
6,107,560 A * 8/2000 Takehara et al. ............ 136/248

FOREIGN PATENT DOCUMENTS

| JP | 08-080060 | 3/1996 |
|---|---|---|
| JP | 09-054623 | 2/1997 |
| JP | 09-084254 | 3/1997 |

* cited by examiner

Primary Examiner—Stephen W. Jackson
Assistant Examiner—James A Demakis
(74) Attorney, Agent, or Firm—Fitzpatrick, Cella, Harper & Scinto

(57) ABSTRACT

Along with the expansion of the application range of solar power generation systems, connection to a single-phase 100-V system is required. To most easily meet this requirement, a non-insulated inverter with a single-phase two-wire 100-V output is used. It is preferable to use an inverter with a single-phase two-wire 200-V output, i.e., a most popular commercially available inverter. For this purpose, a power supplied from a solar battery is converted into a single-phase three-wire 200-V AC power form by the inverter. The output from the inverter with non-insulated inputs and outputs is supplied to a system through a transformer arranged to connect the line of the single-phase three-wire 200-V AC power to a single-phase two-wire 100-V system with one line grounded. To make a ground fault sensor incorporated in the inverter function, the median potential line of the single-phase three-wire 200-V AC power is connected to the ground line of the system.

11 Claims, 11 Drawing Sheets

SYSTEM INTERCONNECTION APPARATUS AND CONNECTION METHOD THEREOF

FIELD OF THE INVENTION

The present invention relates to a system interconnection apparatus and connection method thereof and, more particularly, to a system interconnection power generation apparatus for connecting a power generated by a solar battery or the like to a power system.

BACKGROUND OF THE INVENTION

As home solar power generation systems proliferate, their cost is decreasing. FIG. 1 is a view showing the arrangement of a typical home solar power generation system.

Referring to FIG. 1, a DC power output from a solar battery 1 is converted into an AC power by a system interconnection inverter (to be simply referred to as an "inverter" hereinafter) 8 whose inputs and outputs are non-insulated, and connected to a single-phase three-wire 200-V system (to be simply referred to as a "system" hereinafter) 9 whose median potential line (to be simply referred to as a "neutral line" hereinafter) is grounded by a ground line 91 of a pole mounted transformer.

When an inverter having non-insulated inputs and outputs is used for a system interconnection solar power generation system, the solar battery 1 and system 9 are non-insulated. For this reason, the potential-to-ground of the solar battery 1 is fixed, and a ground fault current flows between one conductor and ground, like a ground fault on the AC side. In order to detect a ground fault at the solar battery 1, the inverter 8 has a current-detection-type ground fault sensor 89.

The power circuit of the inverter 8 is formed as a single-phase two-wire 200-V output to reduce the cost. For this reason, between the inverter 8 and the system 9, the neutral line is used only to detect the voltages of the remaining two lines, and no current flows to the neutral line.

Along with the recent expansion of the application range of solar power generation systems, connection to a single-phase 100-V system is required. To most easily meet this requirement, a non-insulated inverter with a single-phase two-wire 100-V output is connected to a single-phase 100-V system. However, development cost is necessary to newly develop a non-insulated inverter with a single-phase two-wire 100-V output. It is therefore preferable to use an inverter having an inverter circuit which outputs a single-phase two-wire 200-V, i.e., a most popular commercially available inverter at present.

Since an inverter with a single-phase two-wire 200-V output is designed not to flow a current to the neutral line, it is impossible to connect one side (two wires for the O-phase and U- or V-phase) of a single-phase three-wire 200-V output to two wires of a single-phase 100-V system.

To do this, an insulated transformer (to be simply referred to as a "transformer" hereinafter) 10 is used, as shown in FIG. 2. With this arrangement, the inverter 8 with a single-phase two-wire 200-V output and a single-phase 100-V system 4 can be connected. The U- and V-phase terminals are connected to input terminals A and C, respectively, of the transformer 10. The O-phase terminal is connected to input terminal B of the transformer 10. However, this arrangement has the following problems.

(1) The ground fault sensor 89 assumes that the potential-to-ground of the solar battery 1 is fixed and cannot detect a ground fault between one conductor and ground at the solar battery 1 in the arrangement shown in FIG. 2.

(2) The transformer 10 is generally large, heavy, and expensive.

When an inverter with a single-phase two-wire 100-V output is used, the potential-to-ground of a DC circuit is fixed. However, depending on the type of an inverter with a single-phase two-wire 100-V output, if reverse connection on the AC side, i.e., an abnormal connection between a ground-side electrical wire N and a non-ground side electrical wire H occurs, an excessive leakage current is generated through an earth capacitance 11, and an operation error of the ground fault sensor 89 or trip of an electrical leakage breaker takes place. Especially, for a solar battery integrated with a metal roof, the earth capacitance 11 is large, and a measure for preventing the reverse connection is indispensable.

SUMMARY OF THE INVENTION

The present invention has been made to solve the above-described problems individually or altogether, and has as its object to make a commercially available inverter usable in a system interconnection apparatus.

It is another object of the present invention to detect a ground fault between one conductor and ground by a ground fault sensor incorporated in an inverter.

In order to achieve the above objects, according to a preferred aspect of the present invention, a system interconnection apparatus for connecting a power generated by a solar battery to a power system, comprising a non-insulated inverter, arranged to convert a power supplied from a direct current power supply into a single-phase three-wire alternating current power form, a sensor installed in said inverter, arranged to detect a ground fault, and a transformer, arranged to connect a line of the single-phase three-wire alternating current power to a single-phase two-wire power system with one line grounded, wherein a median potential line of the single-phase three-wire alternating current power is connected to a ground line of the power system is disclosed.

It is still another object of the present invention to provide a compact, lightweight, and inexpensive system interconnection apparatus.

In order to achieve the above object, according to another preferred aspect of the present invention, a system interconnection apparatus for connecting a power generated by a solar battery to a power system, comprising a non-insulated inverter, arranged to convert a power supplied from a direct current power supply into a single-phase two-wire alternating current power form, a sensor installed in said inverter, arranged to detect a ground fault, a switch, arranged to connect/disconnect a line of the single-phase two-wire alternating current power to/from a single-phase two-wire power system with one line grounded, and an alarm, arranged to detect an abnormal connection between the power system and the line of the single-phase two-wire alternating current power and generate an alarm is disclosed.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

A system interconnection power generation system according to an embodiment of the present invention will be described below in detail with reference to the accompanying drawings.

A system interconnection solar power generation system will be described below. The present invention can also be applied to a power generation system using not a solar battery but any other DC power supply such as a primary battery, secondary battery, or fuel cell. A DC power obtained by rectifying a power of an AC power supply such as a rotary power generator, or a combination thereof may be used. The DC power supply or AC power supply can be either a voltage source or a current source.

When a solar battery is used, the solar battery can be made of amorphous silicon, crystallite silicon, polysilicon, single-crystal silicon, a combination thereof, or a compound semiconductor. Normally, a plurality of solar battery modules are combined in series and parallel, thereby forming a solar battery array for obtaining desired voltage and current. The present invention does not depend on the form of the solar battery array or the number of solar battery modules used.
First Embodiment
[Arrangement]

Figure 1:
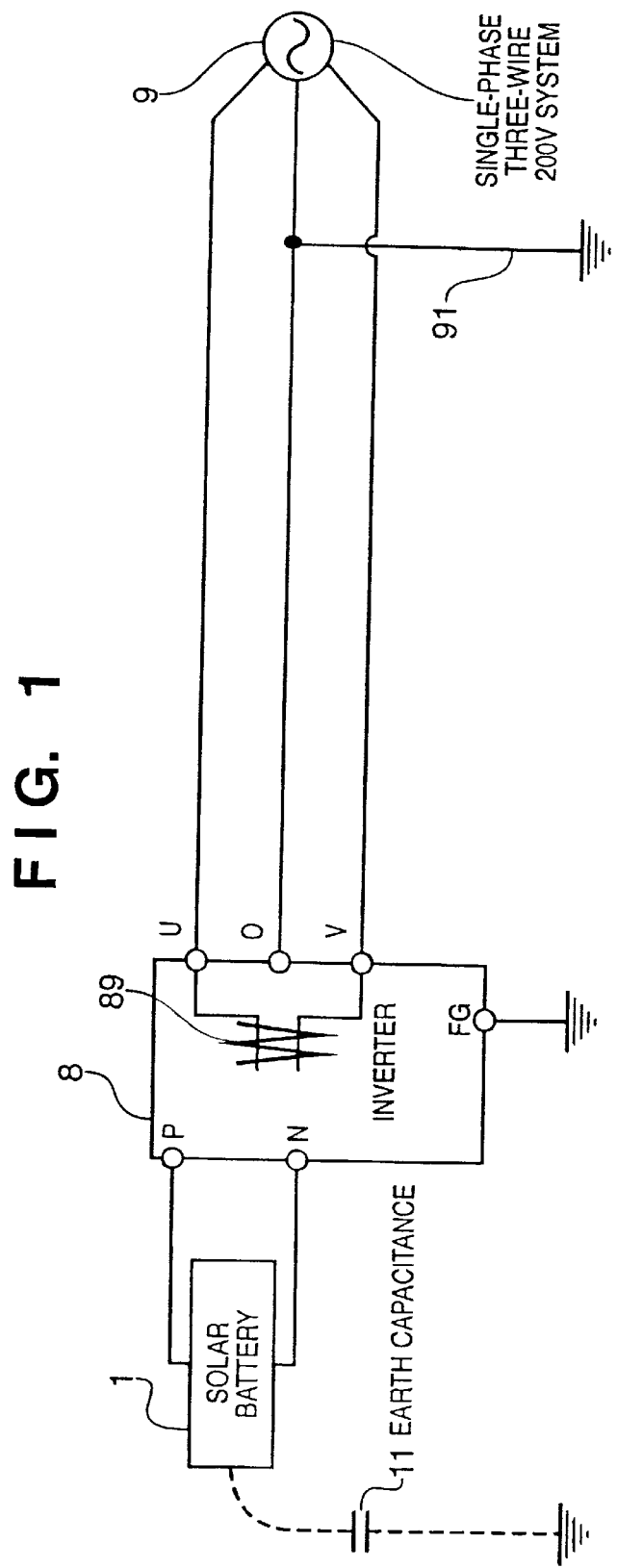
FIG. 1 is a view showing the arrangement of a typical home solar power generation system.
Figure 2:
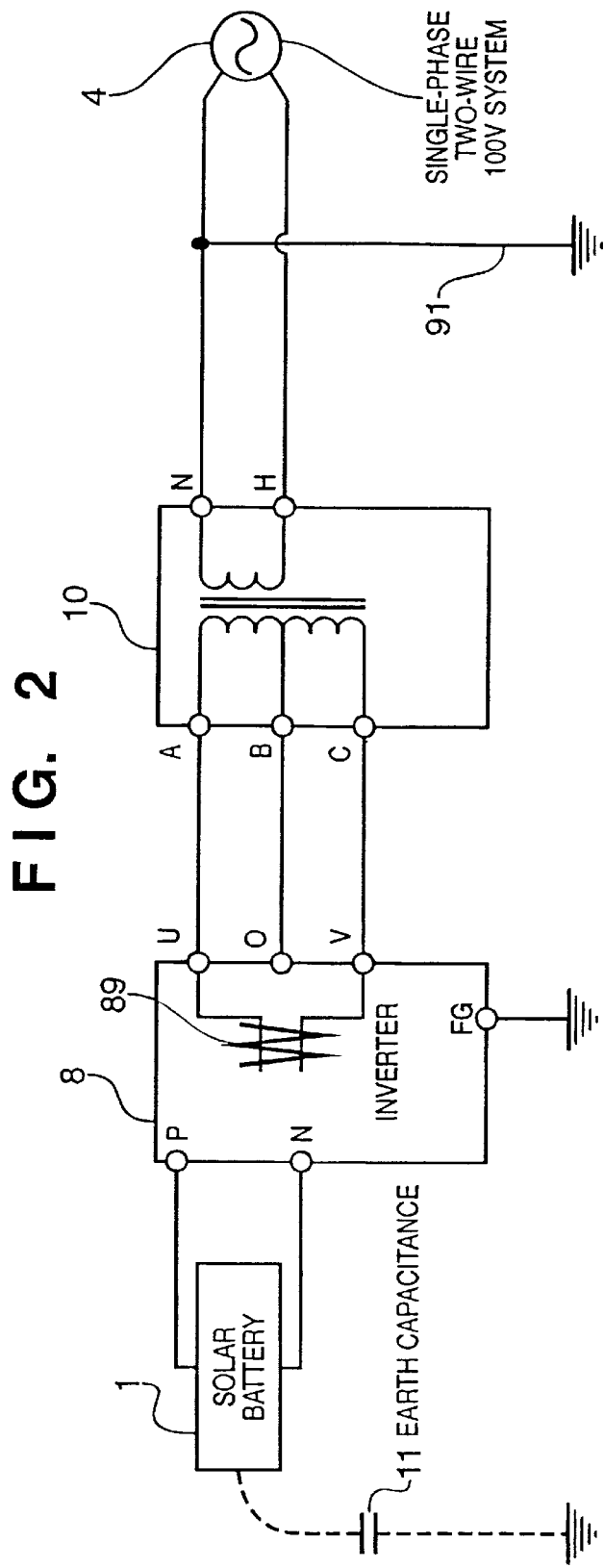
FIG. 2 is a view showing the arrangement of a solar power generation system using an insulated transformer.
Figure 3:
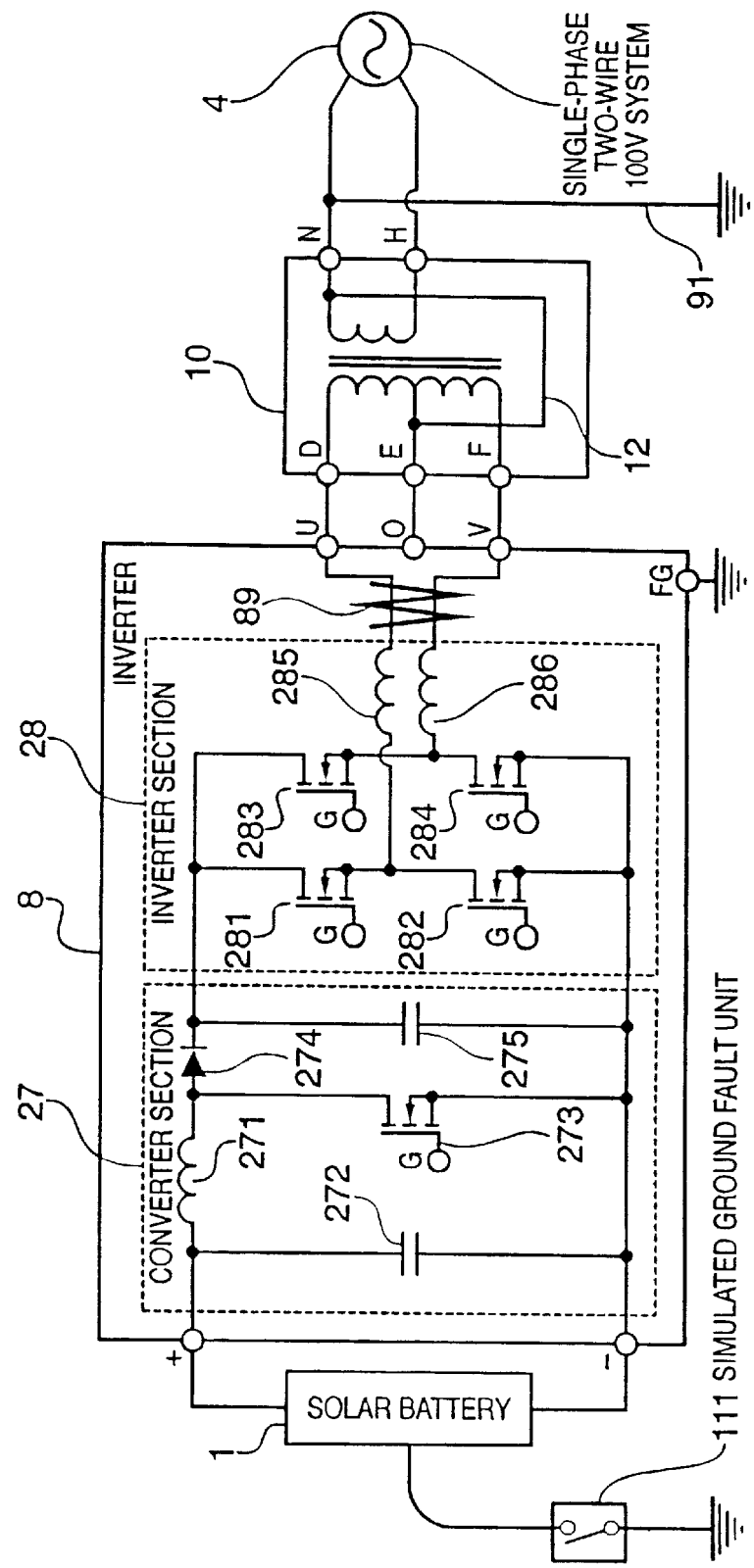
FIG. 3 is a block diagram showing the arrangement of a system interconnection power generation apparatus according to the first embodiment.

FIG. 3 is a block diagram showing the arrangement of a system interconnection power generation apparatus according to the first embodiment. The same reference numerals as in the FIGS. 1 and 2 denote the same parts in FIG. 3, and a detailed description thereof will be omitted.

An inverter 8 is a power conversion unit having non-insulated inputs and outputs and a current-detection-type ground fault sensor 89. The inverter 8 converts a DC power generated by a solar battery 1 into an AC power and outputs a single-phase 100-V AC power by using an inverter section 28. The inverter 8 has three output terminals in correspondence with a single-phase three-wire scheme. Since the O-phase terminal is not connected to the internal circuit of the inverter 8, the inverter 8 actually acts as an inverter with a single-phase two-wire 200-V output.

A transformer 10 has non-insulated inputs and outputs. The transformer 10 converts the single-phase two-wire 200-V output AC power on the inverter 8 side into a single-phase two-wire 100-V AC power and connects it to a single-phase two-wire 100-V system 4. The system 4 is a single-phase two-wire 100-V commercial power system connected to a system interconnection system. One of the two wires is grounded by a ground line 91 of a pole mounted transformer.

The inverter 8 mainly comprises a converter section 27 for boosting a DC voltage input between the positive and negative input terminals, the inverter section 28 for converting the output from the converter section 27 into an AC power and outputting it to the U- and V-phase terminals, the ground fault sensor 89, and an FG terminal for grounding the housing.

The U- and V-phase terminals are connected to non-grounded terminals D and F of the transformer 10. The O-phase terminal is connected to the ground terminal E of the transformer 10 through a neutral line.

Each of the converter section 27 and inverter section 28 comprises various self-arc-suppressing switching elements including a power transistor, MOSFET, IGBT, or GTO, or a combination thereof and elements such as an inductor, capacitor, and diode.

More specifically, the converter section 27 is a general chopper circuit constituted by a switching element 273, boosting inductor 271, blocking diode 274, and smoothing capacitors 272 and 275.

The inverter section 28 comprises a full bridge circuit formed from four switching elements 281 to 284, and inductors 285 and 286. When these switching elements are appropriately switched, the full bridge circuit generates and outputs a rectangular AC voltage waveform. The inductors 285 and 286 serve as the system interconnection reactors of the inverter 8, which shape the AC current waveform to be output from the inverter 8 into a sinusoidal waveform.

The ground fault sensor 89 detects the sum of currents (almost zero in a non-grounded state) flowing to the non-grounded lines (U- and V-phase terminals) of the inverter 8, thereby detecting a ground fault at the solar battery 1.

The transformer 10 is a transformer whose the primary winding (200 V side) and the secondary winding (100 V side) are non-insulated. A terminal to which a ground-side electrical wire N on the secondary side is connected and a terminal (center tap) to which the neutral line on the primary side is connected are connected by a short-circuit (to be referred to as a "non-isolating connection" hereinafter) 12, thereby non-insulating the primary and secondary windings. The winding ratio of the primary side to the secondary side of the transformer 10 is 2:1.

A simulated ground fault unit 111 connected between the solar battery 1 and the ground potential is used to check the operation of the apparatus shown in FIG. 3.
[Operation]

The operation of the apparatus shown in FIG. 3 will be described next.

In the system interconnection power generation apparatus shown in FIG. 3, a ground fault at the solar battery 1 is caused by the simulated ground fault unit 111, and the operation of the ground fault sensor 89 is checked. As experimental conditions, the output voltage of the solar battery 1 is about 200 V, the output power is about 3.2 kW, the output power of the inverter 8 is about 3 kW, and the sum of ground fault resistance of the simulated ground fault unit 111 and the ground resistance of the ground line 91 is about 500 Ω.

With the above experiment, it was confirmed that a ground fault current of about 0.4 A flowed, and the ground fault current was detected by the ground fault sensor 89. When the same experiment as described above was conducted for the system interconnection solar power generation system shown in FIG. 2, no ground fault current flowed, and the ground fault sensor 89 detected no ground fault current.

As described above, in the system interconnection power generation apparatus according to the first embodiment, the inverter 8 having the current-detection-type ground fault sensor 89 and non-insulated inputs and outputs converts a DC power into an AC power and outputs it as a single-phase three-wire 200-V AC power. The single-phase three-wire 200-V AC power is connected to the single-phase two-wire 100-V system 4 through the transformer 10 having non-insulated inputs and outputs. Hence, an inexpensive system interconnection power generation apparatus connected to the single-phase two-wire 100-V system 4 using the inverter 8 having an inverter circuit which outputs a single-phase two-wire 200-V, i.e., a most popular commercially available inverter at present, can be provided. A ground fault at the solar battery 1 can be detected by the ground fault sensor 89 incorporated in the inverter 8.

The arrangement of the first embodiment is not limited to the above arrangement as long as the potential-to-ground of the solar battery 1 is fixed.

For example, as far as the O-phase terminal of the inverter 8 and the sensor tap of the transformer 10 are connected, the U- and V-phase terminals of the inverter 8 and the remaining two terminals on the primary side of the transformer 10 can be arbitrarily connected.

The non-isolating connection 12 preferably connects the ground-side electrical wire N and the sensor tap of the transformer 10. Even when one of the remaining two wires (U- or V-phase electrical wire) on the primary side and the non-ground-side electrical wire H are connected, the ground fault sensor 89 functions because the potential-to-ground of the solar battery 1 is fixed. The non-isolating connection 12 may be connected through a resistor or capacitor.

When the O-phase terminal of the inverter 8 (or the sensor tap of the transformer 10) is grounded, the potential-to-ground of the solar battery 1 can be fixed. Hence, the non-isolating connection 12 of the transformer 10 can be omitted, and the ground fault sensor 89 functions.

The internal arrangement of the inverter 8 is not limited to that shown in FIG. 3. Any other inverter having a current-detection-type ground fault sensor and non-insulated inputs and outputs, which converts a DC power into single-phase two-wire 200-V AC power, can be used.

Second Embodiment

A system interconnection power generation system according to the second embodiment of the present invention will be described below. The same reference numerals as in the first embodiment denote almost the same parts in the second embodiment, and a detailed description thereof will be omitted.

[Arrangement]

Figure 4:
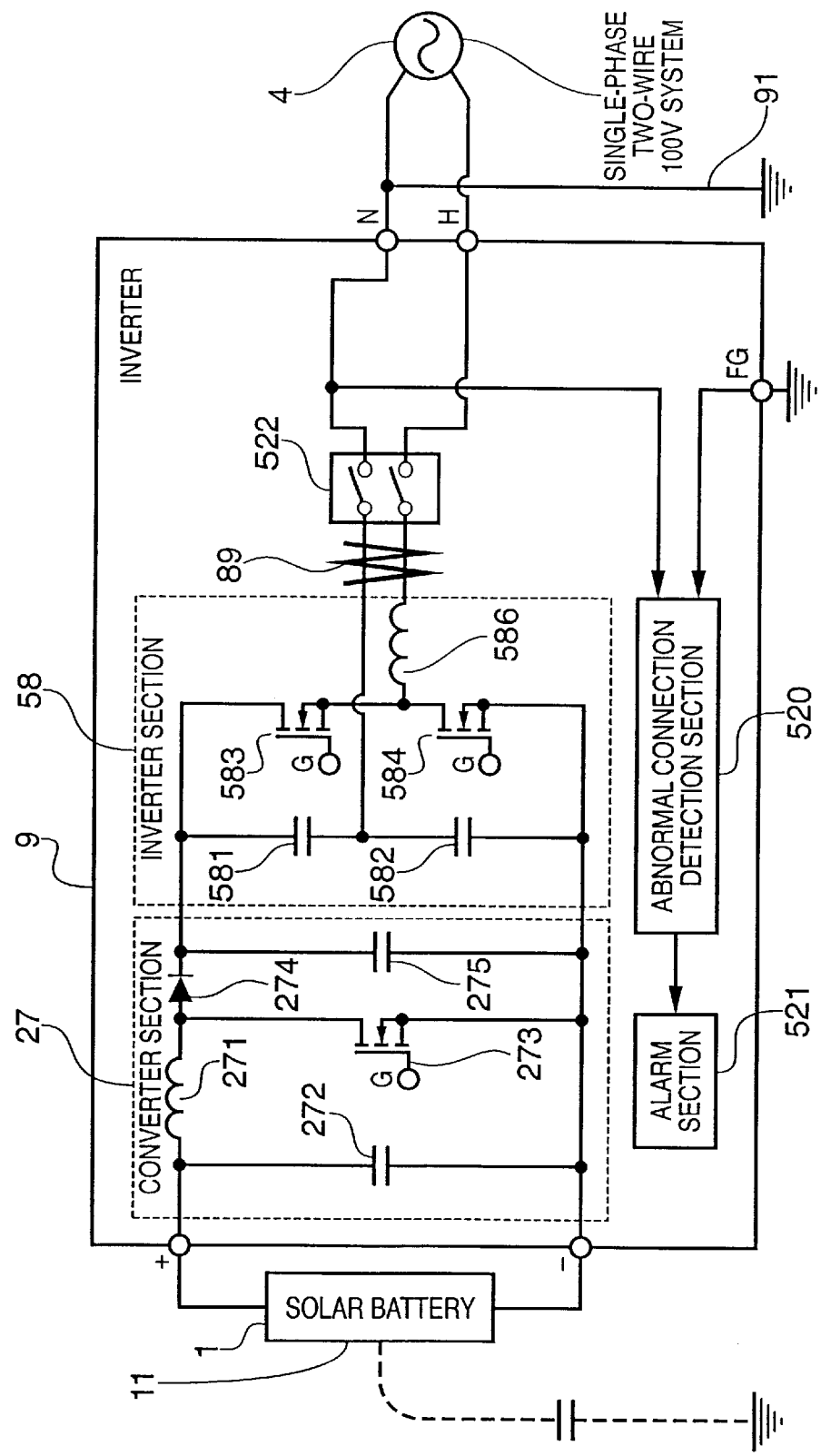
FIG. 4 is a block diagram showing the arrangement of a system interconnection power generation apparatus according to the second embodiment.

FIG. 4 is a block diagram showing the arrangement of a system interconnection power generation apparatus according to the second embodiment.

An inverter 9 is a power conversion unit having non-insulated inputs and outputs and a current-detection-type ground fault sensor 89. The inverter 9 is a single-phase two-wire 100-V inverter for converting a DC power generated by a solar battery 1 into an AC power and outputting a single-phase 100-V AC power. The single-phase two-wire 100-V AC power from the inverter 9 is connected to a single-phase two-wire 100-V system 4.

The inverter 9 mainly comprises a converter section 27 for boosting a DC voltage input between the positive and negative input terminals, an inverter section 58 for converting the output from the converter section 27 into an AC power and outputting it, the ground fault sensor 89, an FG terminal for grounding the housing, an abnormal connection detection section 520, an alarm section 521, and a switch 522 for connecting/disconnecting the inverter 9 and system 4.

The inverter section 58 is formed from a half bridge circuit constituted by capacitors 581 and 582 and switching elements 583 and 584, and an inductor 586. When these switching elements are appropriately switched, the half bridge circuit generates and outputs a rectangular AC voltage waveform. The inductor 586 serves as the system interconnection reactor of the inverter 9, which shapes the AC current waveform to be output from the inverter 9 into a sinusoidal waveform. The half bridge circuit used in an inverter with a relatively low output power can use switching elements in a number smaller than that in the full bridge circuit described in the first embodiment. Additionally, the inverter 9 uses only one system interconnection reactor. Since the numbers of switching elements and system interconnection reactors are decreased, the inverter becomes compact, lightweight, and inexpensive.

[Influence of Earth Capacitance]

Figure 6:
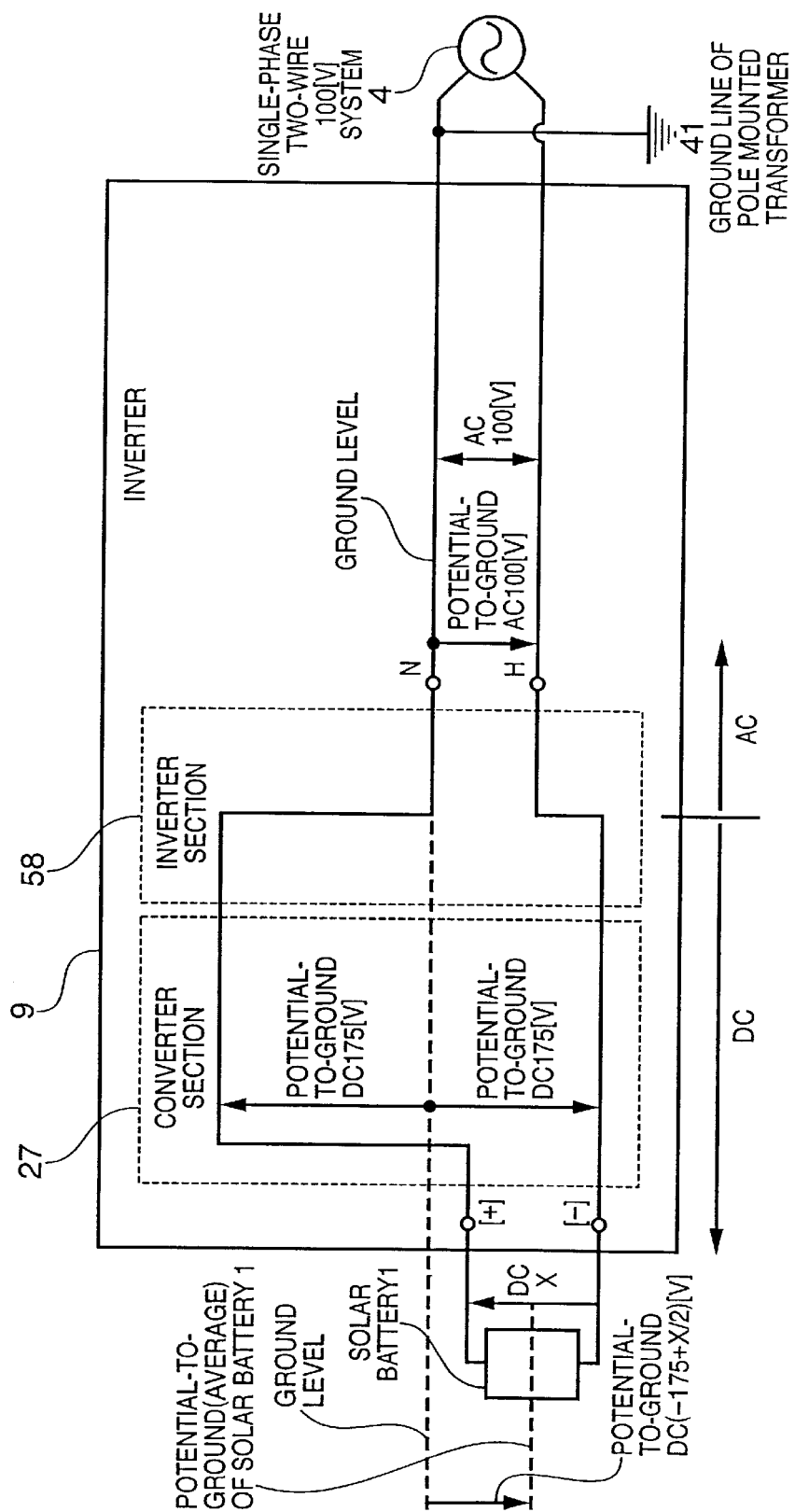
FIG. 6 is a view showing the potentials-to-ground of the respective portions of the solar power generation system according to the second embodiment in a normal connection state.
Figure 7:
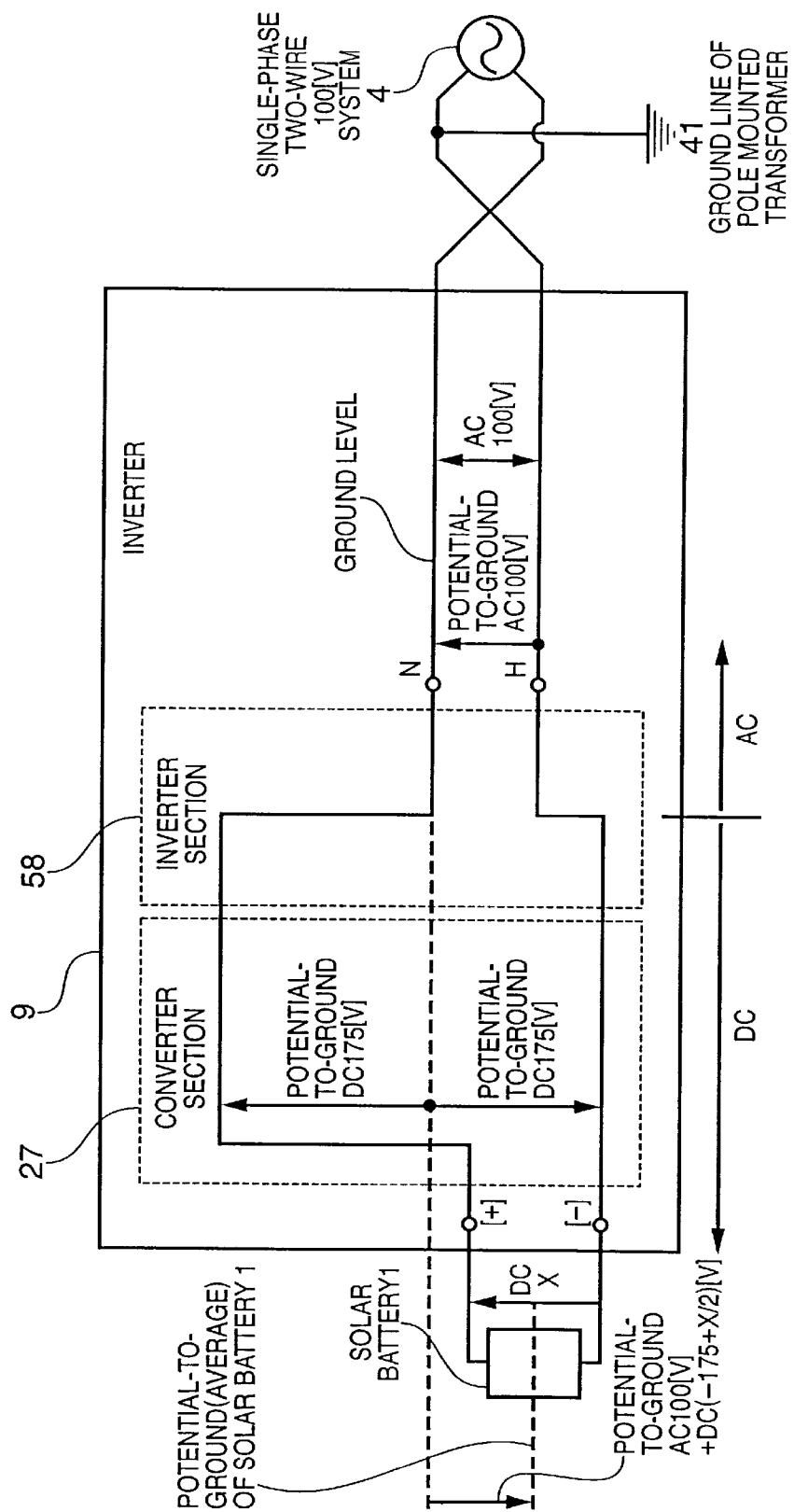
FIG. 7 is a view showing the potentials-to-ground of the respective portions of the solar power generation system according to the second embodiment in an abnormal connection state.

FIGS. 6 and 7 are views for schematically explaining the potentials-to-ground of the respective portions of a solar power generation system. FIG. 6 shows a state wherein the inverter 9 and system 4 are normally connected (the ground side of the system 4 is connected to the N terminal). FIG. 7 shows a state wherein the inverter 9 and system 4 are erroneously connected (the ground side of the system 4 is connected to the H terminal).

The inverter section 58 generates an AC voltage waveform with an effective value of 100 V as the output of the inverter 9 by defining the N terminal as a zero point. The converter section 27 outputs a DC voltage twice or more of about 141 V as the peak value of the effective value of 100 V. In the second embodiment, the DC voltage is ±175 V with reference to the N terminal because of the circuit arrangement.

In the normal connection state, when the output voltage of the solar battery 1 is X [V], the average value of the potential-to-ground of the solar battery 1 is DC−175+X/2 [V], as is apparent from FIG. 6. In the abnormal connection state, since the potential-to-ground of the N terminal is AC 100 V, as is apparent from FIG. 7, the average value is DC (−175+X/2)V+AC 100 V.

Generally, the output voltage of the solar battery 1 is several hundred [V], and the average value consequently becomes DC several hundred [V]. For this reason, in the normal connection state, an insulation resistance of several MΩ or more is ensured between the solar battery 1 and ground. Hence, in the normal connection state, the ground fault current at the solar battery 1, which flows to ground, is almost zero.

On the other hand, in the abnormal connection state as shown in FIG. 7, since AC 100 V is applied to the average value of the potentials-to-ground of the solar battery 1, a ground fault current flows from the solar battery 1 to ground through an earth capacitance 11, and the electrical leakage breaker of the system interconnection system is activated.

The earth capacitance 11 is the static capacitance between the solar battery 1 and the ground potential, which is about 1 $\mu$F for a solar battery for generating a power of 1 kW by standard sunlight. When the earth capacitance 11 is 1 $\mu$F, and the sum of ground resistance of the solar battery 1 and that of the system 4 is 500 $\Omega$, $100/\sqrt{[500^2+\{1/(\omega \times 10^{-6})\}^2]}$. Hence, a ground fault current $I_L$ of 30 mA or more is generated at 50 Hz, and a ground fault current $I_L$ of 40 mA or less is generated at 60 Hz. This current value is sufficient to trip the electrical leakage breaker.

[Abnormal Connection Detection Section]

When a ground fault current flows due to the above abnormal connection, the electrical leakage breaker operates to disconnect the inverter 9 from the system 4. Although connection of the inverter 9 and system 4 can be restored by correcting the abnormal connection, power supply to the load (electrical/power devices) in the subscriber's house that receives the power from the system 4 also stops. Hence, a measure for preventing any trip of the electrical leakage breaker due to an abnormal connection is necessary.

To connect the inverter 9 to the system 4, the switch 522 is turned off, and then, the inverter 9 is connected to the system 4. When the switch 522 is kept off, no ground fault current flows, and the electrical leakage breaker does not operate even when an abnormal connection occur.

Figure 5:
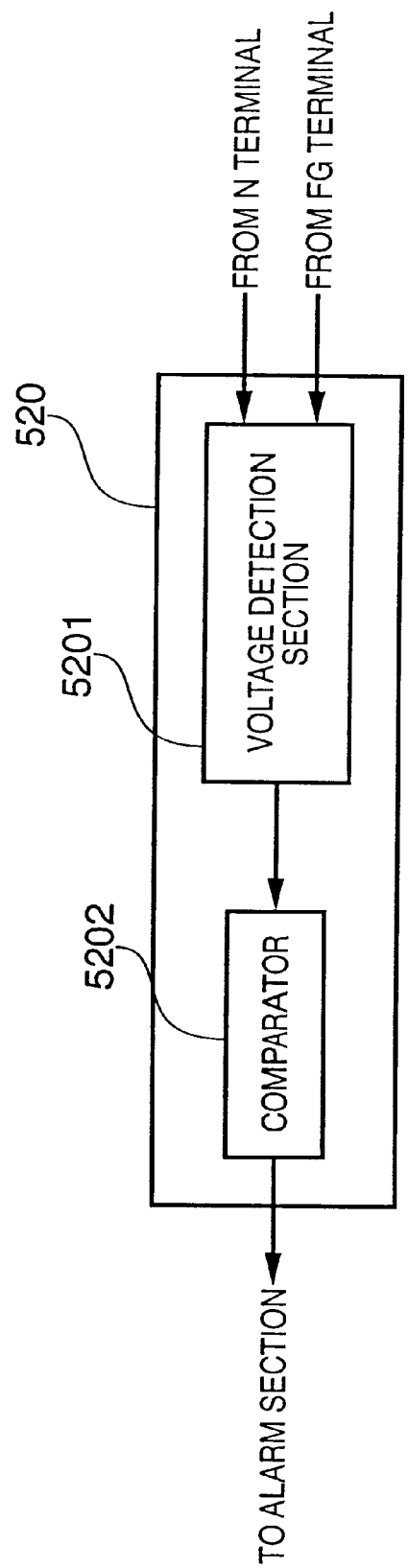
FIG. 5 is a block diagram showing the arrangement of an abnormal connection detection section.

As shown in FIG. 5, in the abnormal connection detection section 520, a voltage detection section 5201 detects the voltage (absolute value) between the N terminal and the FG terminal of the inverter 9, and a comparator 5202 compares the detected voltage with a predetermined value (e.g., 20 V). If the detected voltage is more than the predetermined value, the alarm section 521 is driven to warn the user of an abnormal connection.

As the alarm section 521, any device capable of transmitting an abnormal connection to a person or information terminal by light, sound, mechanical vibration, electrical signal, optical signal, or the like can be used. The power to the abnormal connection detection section 520 and alarm section 521 can be supplied from either the system 4 or the solar battery 1 or can be supplied from a primary battery or secondary battery.

Figure 9:
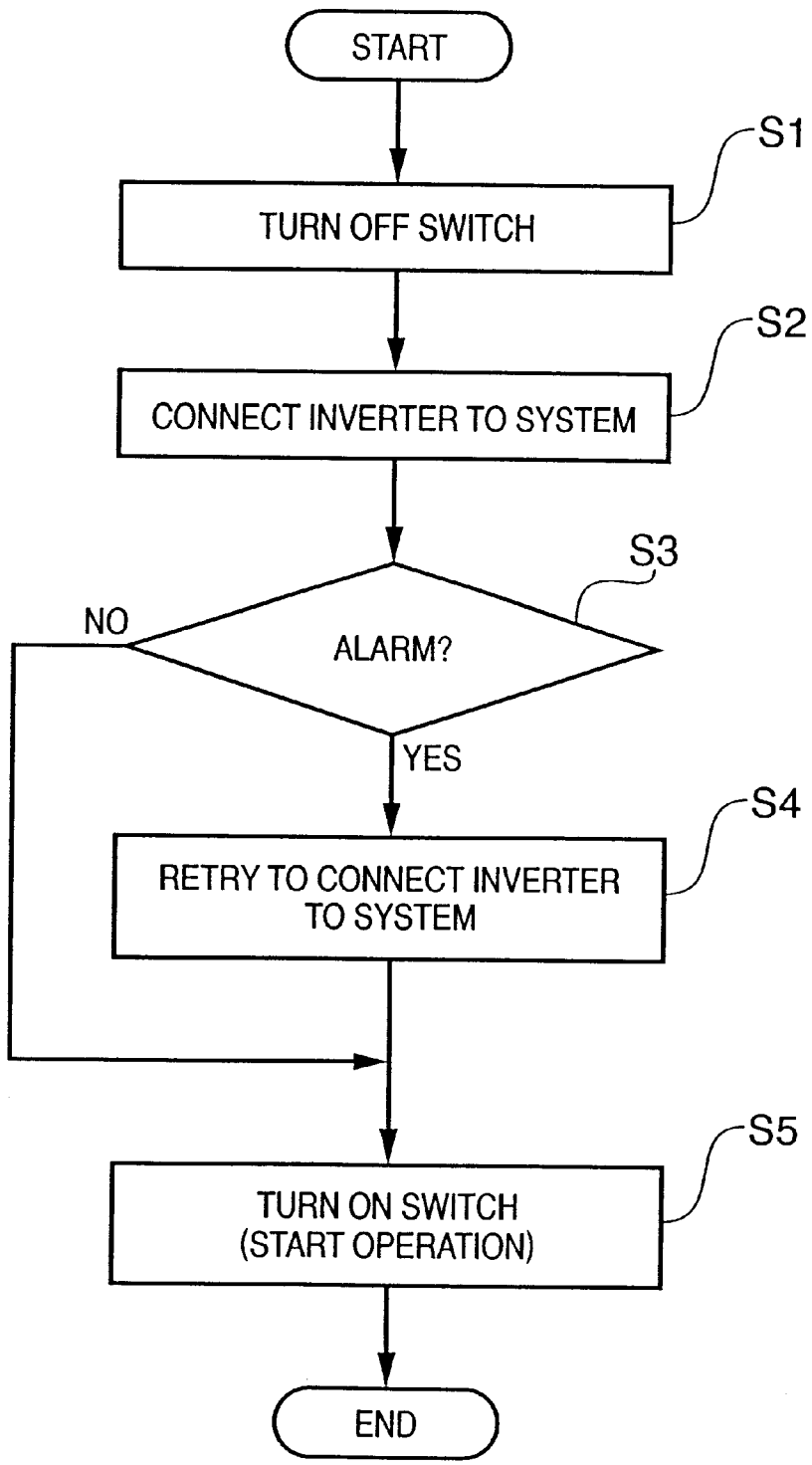
FIG. 9 is a flow chart showing the operation procedure in connecting the inverter of the second embodiment to a system.

FIG. 9 is a flow chart showing the operation procedure in connecting the inverter 9 to the system 4.

In step S1, the switch 522 is turned off. In step S2, the system 4 and inverter 9 are connected. In step S3, it is determined whether an abnormal connection alarm is generated. If YES in step S3, connection of the system 4 and inverter 9 is retried (i.e., connections of the N and H terminals are reversed) in step S4. In step S5, the switch 522 is turned on, and operation of the system interconnection power generation system is started. After connection of the inverter 9 and system 4 is ended, power supply to the abnormal connection detection section 520 and alarm section 521 may be turned off.

As described above, when the potential-to-ground of the N terminal of the inverter 9 is detected, an abnormal connection between the system 4 and the inverter 9 can be detected, and an alarm can be generated. Hence, a compact, lightweight, and inexpensive system interconnection power generation system which has an abnormal connection preventing function and uses the compact, lightweight, and inexpensive inverter 9 can be provided.

When the inverter 9 and system 4 are connected in accordance with the operation procedure shown in FIG. 9, no ground fault current flows and the electrical leakage breaker does not trip even when an abnormal connection occurs. Hence, reliable and safe operation is possible.

If the control section of the inverter 9 has an extra processing capability, the function of the abnormal connection detection section 520 can be assigned to the control section. Hence, a more inexpensive and compact system interconnection power generation system having an abnormal connection preventing function can be provided.

In the abnormal connection detection section 520, when the potential-to-ground of the N terminal is detected as digital data, and only the frequency component of the system 4 is detected, the influence of noise can be eliminated, and a detection error can be minimized.

The internal arrangement of the inverter 9 is not limited to that shown in FIG. 4. Any other power conversion unit can be used as long as it has the current-detection-type ground fault sensor 89 and non-insulated inputs and outputs, and converts a power generated by the solar battery 1 into an AC power and outputs it to the single-phase two-wire 100-V system 4 with one line grounded. That is, any arrangement capable of fixing the potential-to-ground of the solar battery 1 can be used, as in the first embodiment.

As the switch 522, a switch of any type such as a mechanical switch or semiconductor switch can be used. When the abnormal connection detection section 520 detects no abnormal connection, the switch 522 may be driven and turned on. With this arrangement, the operability in connection can be improved.

Third Embodiment

A system interconnection power generation system according to the third embodiment of the present invention will be described below. The same reference numerals as in the first or second embodiment denote almost the same parts in the third embodiment, and a detailed description thereof will be omitted.

Figure 8:
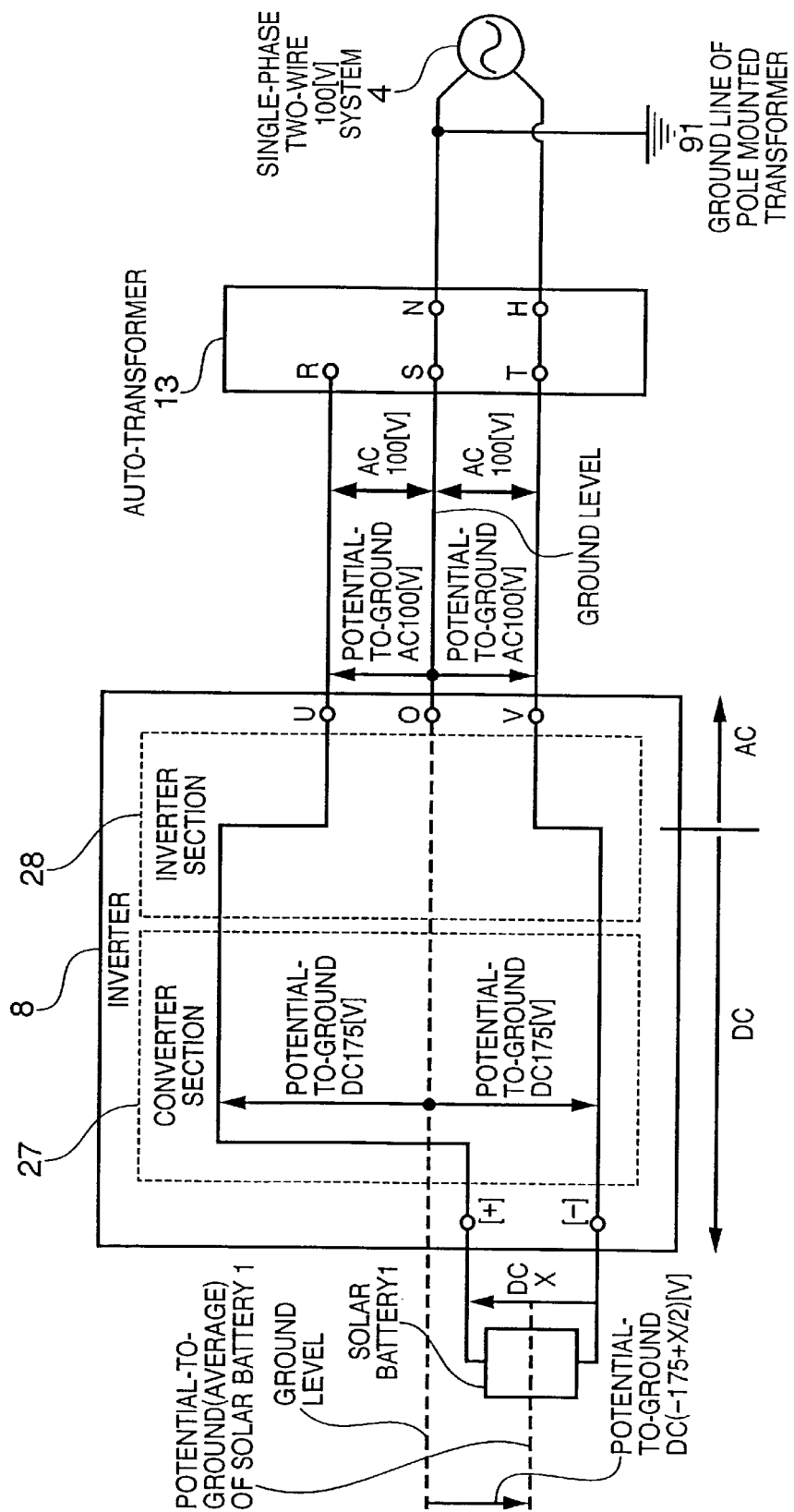
FIG. 8 is a view showing the potentials-to-ground of the respective portions of a solar power generation system according to the third embodiment in a normal connection state.
Figure 11:
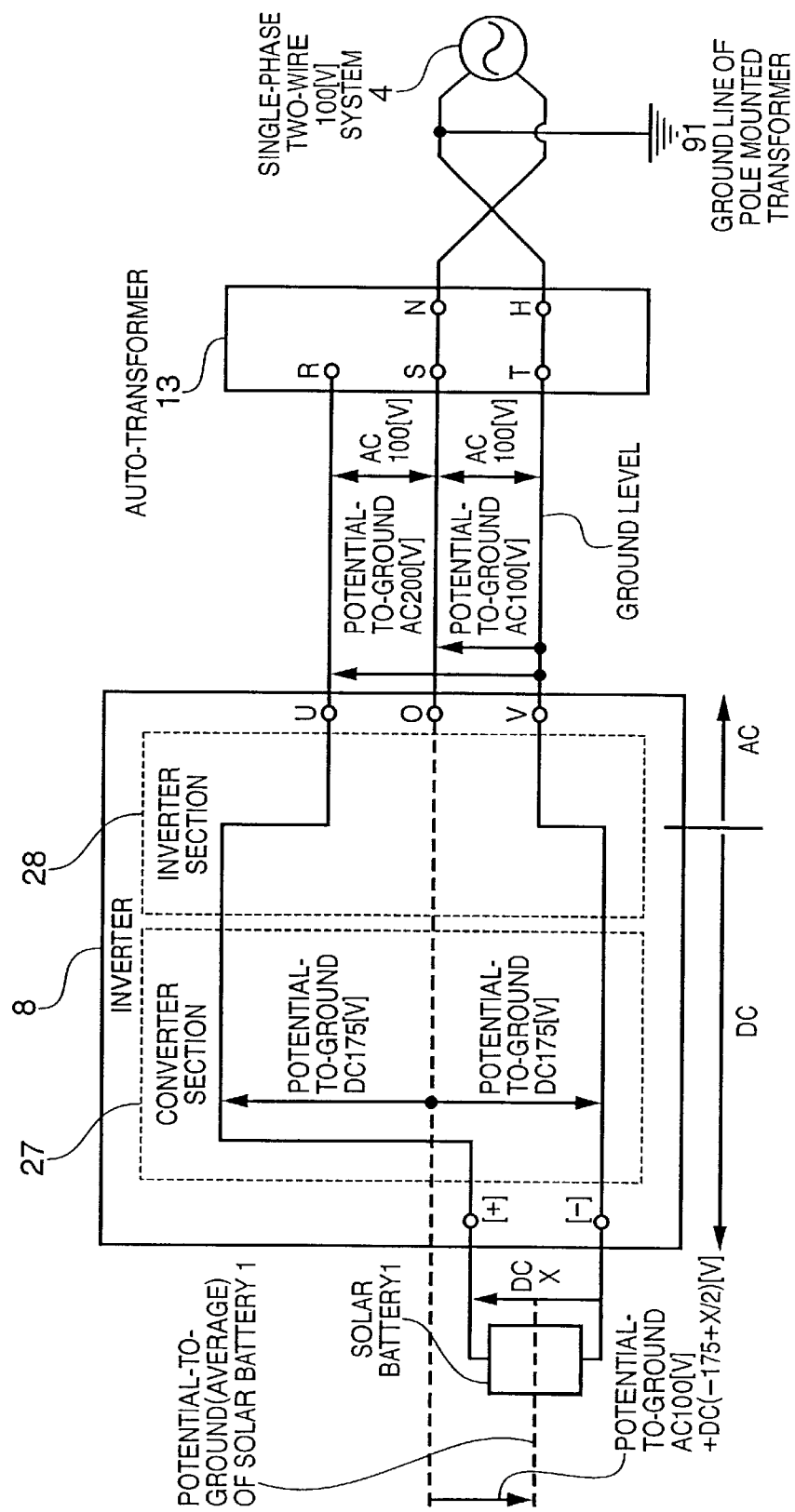
FIG. 11 is a view showing the potentials-to-ground of the respective portions of the solar power generation system according to the third embodiment in an abnormal connection state.

FIGS. 8 and 11 show the potentials-to-ground of the respective portions of the system interconnection system, though details of the potentials-to-ground of an inverter 8 and solar battery 1 will be omitted.

[Arrangement]

Figure 10:
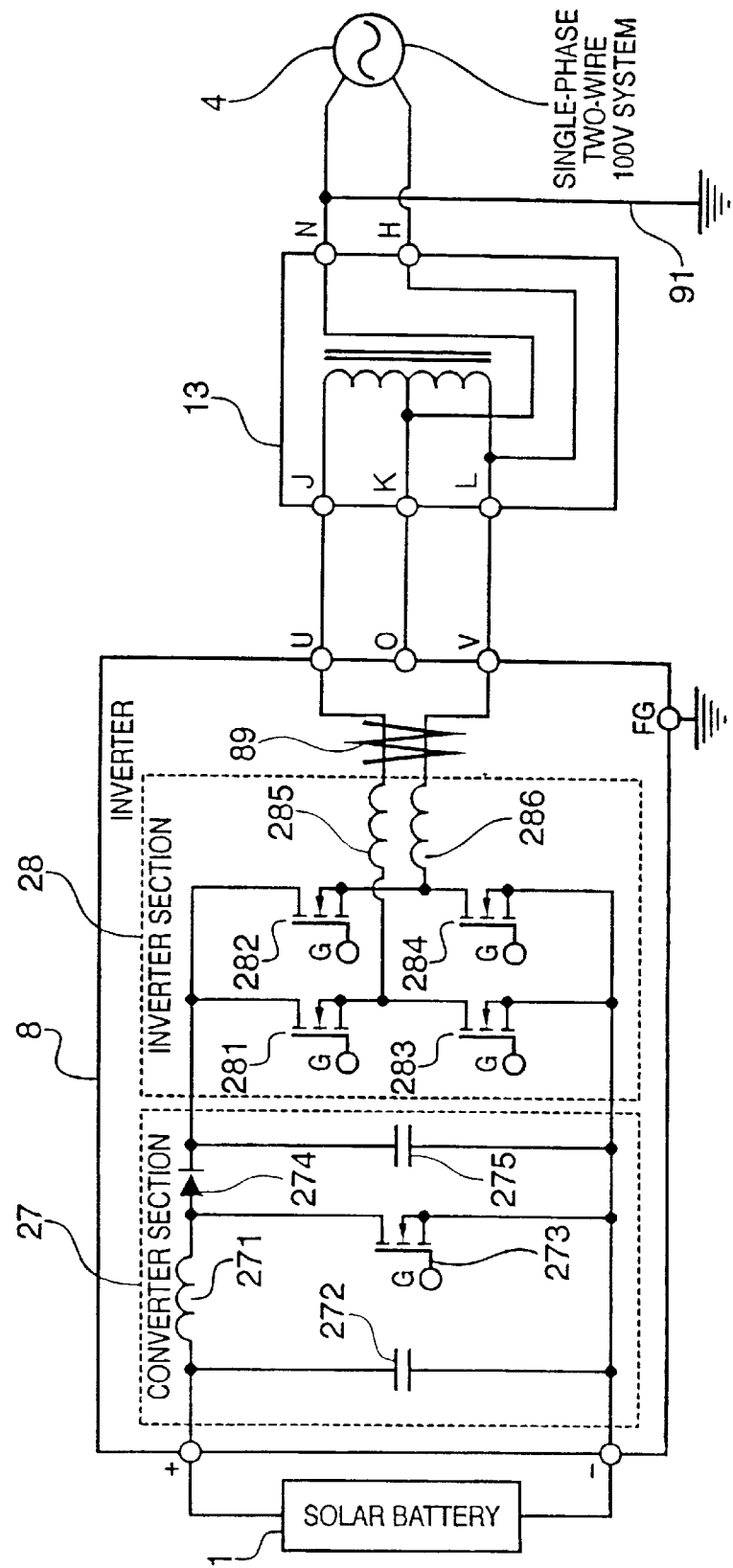
FIG. 10 is a block diagram showing the arrangement of a system interconnection power generation apparatus according to the third embodiment.

FIG. 10 is a block diagram showing the arrangement of a system interconnection power generation apparatus according to the third embodiment.

In the first embodiment, the primary and secondary windings of the transformer 10 are connected by the non-isolating connection 12 whereby the transformer 10 is used as a non-insulated transformer. In the third embodiment, an auto-transformer 13 is used.

In the system interconnection power generation system of the third embodiment, the inverter 8 which has non-insulated inputs and outputs and a current-detection-type ground fault sensor 89 converts a DC power into an AC power, outputs it as a single-phase three-wire 200-V AC power, and it is connected to a single-phase two-wire 100-V system 4 through the transformer 13 having non-insulated inputs J, K and L and outputs N and H. Hence, an inexpensive system interconnection power generation system connected to the single-phase two-wire 100-V system 4 using the inverter 8 with a single-phase two-wire 200-V output, i.e., a most popular commercially available inverter at present, can be provided. A ground fault at the solar battery 1 can be detected by the ground fault sensor 89 incorporated in the inverter 8.

In the first embodiment, the transformer 10 whose primary and secondary windings which are supposed to be insulated from each other are non-insulated by the non-isolating connection 12 is used. In the third embodiment, the auto-transformer 13 whose primary and secondary windings are non-insulated is used. In the auto-transformer, since only the current difference between the primary current and the secondary current flows to a winding (common winding) common to the primary and secondary sides, the sectional area of the electrical wire of the common winding portion can be small. Hence, the transformer 13 is more compact, light-weight, and inexpensive (about ½) than the transformer 10, and the system interconnection power generation system also becomes compact, light-weight, and inexpensive.

According to the above-described embodiments, the following effects can be obtained.

(1) When an easily commercially available inverter (e.g., a single-phase three-wire 200-V output of a full bridge scheme) having non-insulated inputs and outputs and a current-detection-type ground fault sensor is connected to a single-phase two-wire 100-V system with one line grounded through a transformer having non-insulated inputs and outputs, the ground fault sensor can be directly used, and a compact, lightweight, and inexpensive system interconnection power generation system can be provided.

(2) When an auto-transformer is used as the transformer having non-insulated inputs and outputs in the arrangement (1), a more compact, lightweight, and inexpensive system interconnection power generation system can be provided.

(3) When an easily commercially available inverter (e.g., a single-phase two-wire 100-V output of a half bridge scheme) having non-insulated inputs and outputs and a current-detection-type ground fault sensor is connected to a single-phase two-wire 100-V system with one line grounded, the ground fault sensor can be directly used, and a compact, lightweight, and inexpensive system interconnection power generation system can be provided.

(4) A switch for connecting/disconnecting the inverter and system, and an arrangement for generating an alarm when the potential-to-ground of an output terminal of the inverter, to which the ground-side electrical wire of the system should be connected, is detected, and the detected potential to ground has a predetermined value or more are added to the arrangement (3). With these arrangements, the inverter is connected to the system while keeping the switch OFF, and when an alarm is generated, connection is retried, the switch is turned on, and then, operation of the system interconnection power generation system is started. In this case, any ground fault current generated when the inverter and system are erroneously connected can be prevented, and trip of the electrical leakage breaker can be prevented. That is, a system interconnection power generation system having a function of preventing any abnormal connection between the inverter and system can be provided.

As many apparently widely different embodiments of the present invention can be made without departing from the spirit and scope thereof, it is to be understood that the invention is not limited to the specific embodiments thereof except as defined in the appended claims.

What is claimed is:

1. A system interconnection apparatus for connecting a power generated by a solar battery to a power system, comprising:

a non-insulated inverter, arranged to convert a power supplied from a direct current power supply into a single-phase three-wire alternating current power form;

a sensor installed in said inverter, arranged to detect a ground fault; and a transformer, arranged to connect a line of the single-phase three-wire alternating current power to a single-phase two-wire power system with one line grounded, wherein a median potential line of the single-phase three-wire alternating current power is connected to a ground line of the power system.

2. The apparatus according to claim 1, wherein said transformer comprises an auto-transformer.

3. The apparatus according to claim 1, wherein the direct current power supply comprises a solar battery.

4. A system interconnection apparatus for connecting a power generated by a solar battery to a power system, comprising:

a non-insulated inverter, arranged to convert a power supplied from a direct current power supply into a single-phase two-wire alternating current power form;

a sensor installed in said inverter, arranged to detect a ground fault;

a switch, arranged to connect/disconnect a line of the single-phase two-wire alternating current power to/from a single-phase two-wire power system with one line grounded; and an alarm, arranged to detect an abnormal connection between the power system and the line of the single-phase two-wire alternating current power and generate an alarm.

5. The apparatus according to claim 4, wherein said switch and alarm serve as means for preventing a ground fault current from flowing through an earth electrostatic capacitance of the direct current power supply.

6. The apparatus according to claim 4, wherein said switch is turned off before said inverter is connected to the power system and is turned on when the alarm is not generated after connection.

7. The apparatus according to claim 4, wherein the direct current power supply comprises a solar battery.

8. A connection method of a system interconnection apparatus having a non-insulated inverter arranged to convert a power supplied from a direct current power supply into a single-phase two-wire alternating current power form, a sensor installed in the inverter, arranged to detect a ground fault, a switch arranged to connect/disconnect a line of the single-phase two-wire alternating current power to/from a single-phase two-wire power system with one line grounded, and an alarm arranged to detect an abnormal connection between the power system and the line of the single-phase two-wire AC power and generate an alarm, comprising the steps of:

turning off the switch;

connecting the inverter to the power system; and turning on the switch when the alarm is not generated.

9. The method according to claim 8, wherein when the alarm is generated, the abnormal connection between the inverter and the power system is corrected, and then, the switch is turned on.

10. The method according to claim 9, wherein the switch and alarm serve as means for preventing a ground fault current from flowing through an earth electrostatic capacitance of the direct current power supply.

11. The method according to claim 8, wherein the direct current power supply comprises a solar battery.

* * * * *